Aug. 16, 1949.   H. G. HAAS   2,479,233
AIR-COOLED GENERATOR
Filed Aug. 29, 1946
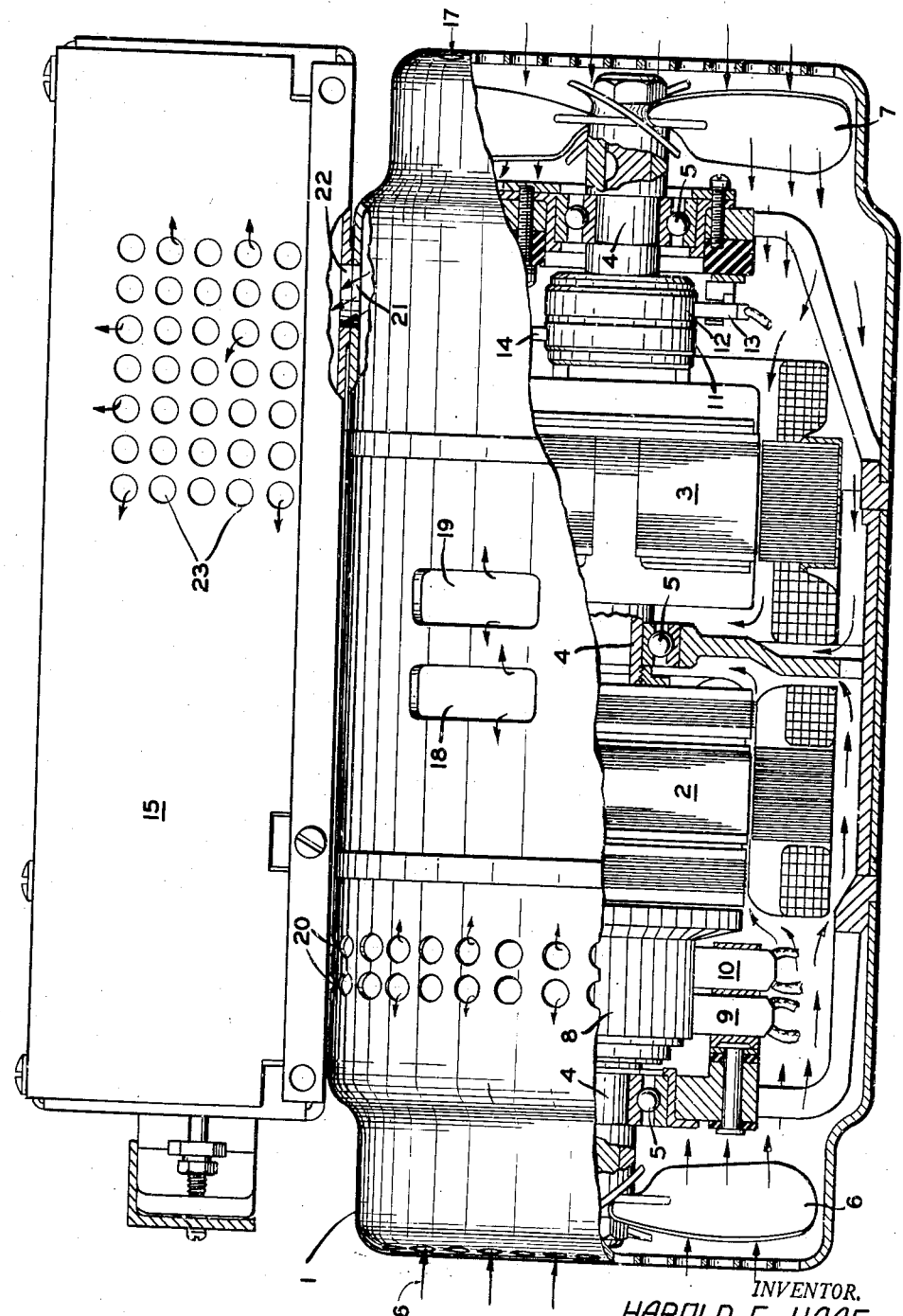
INVENTOR.
HAROLD G. HAAS
BY
*Herbert L. Davis, Jr.*
ATTORNEY Patented Aug. 16, 1949

2,479,233

UNITED STATES PATENT OFFICE 2,479,233

AIR-COOLED GENERATOR

Harold Gustow Haas, Belleville, N. J., assignor to Bendix Aviation Corporation, Teterboro, N. J., a corporation of Delaware Application August 29, 1946, Serial No. 693,777

3 Claims. (Cl. 171—252)

The present invention relates to improved air-cooled electrical devices, such as motor driven generators, in the operation of which heat is generated requiring dissipation in order to secure most efficient operation.

An object of the invention is to provide a single housing for a motor-generator having air intake openings at the opposite ends and air exhaust openings at a point intermediate the opposite ends, together with air exhaust openings arranged adjacent and immediately above the commutator and brushes for the motor and immediately behind a motor driven fan so as to permit the escape of heated air from the commutator without the necessity of the heated air washing over the motor.

Another object of the invention is to provide additional ports opening from the housing of the motor-generator into a control box for cooling operating parts carried in the box.

Another object of the invention is to provide a novel arrangement of air exhaust ports positioned adjacent the motor brushes and immediately behind the motor driven fan so as to permit the escape of heated air from the commutator without the heated air washing over the motor.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

In the drawing, there is illustrated a device embodying the invention and showing the casing or housing thereof broken away in part to better illustrate the structure therein.

Referring to the drawing, numeral 1 indicates a casing or housing including therein an electric motor 2, and generator 3 driven by the motor 2. The motor 2 has a drive shaft 4 mounted on suitable bearings 5 and is drivingly connected to the generator 3 and suitable fans 6 and 7 positioned at opposite ends thereof. The motor 2 has a suitable input commutator 8 which cooperates with suitable carbon brushes 9 and 10, while the generator 3 has suitable output rings 11 and 12 and brushes 13 and 14 cooperating therewith. The foregoing structure within the casing 1 may be of conventional type.

There is further provided a control box 15 suitably mounted upon the casing 1 and carrying the conventional elements of the control system such as current rectifiers and voltage regulator which may also be of conventional type.

The subject matter of the present invention resides in the novel arrangement of the casing 1 and control box 15 and the parts therein so as to effect the more efficient cooling of the same.

This is specifically effected in the present invention as shown in the accompanying drawing by providing air openings 16 in one end of the casing 1 and air openings 17 in the other end of the casing 1 through which the fans 6 and 7, respectively, may draw cooling air.

Main air exhaust ports 18 and 19 are provided in the casing 1 intermediate the opposite ends thereof.

Further air exhaust ports 20 are provided in the casing 1 immediately above where the commutator 8 and brushes 9 and 10 are located. These exhaust ports 20 arranged in the manner indicated are very important for maximum cooling efficiency, since the ports 20 permit the heat of the brushes 9 and 10 and commutator 8, which is considerable, to be exhausted by the air flow from the fan 6 directly without the necessity of such air flow washing back over the motor 2 as has heretofore been the case.

Through the arrangement of the last mentioned air exhaust ports 20 the motor 1 may run as much as 30° C. cooler than would otherwise be the case and a very great improvement in the efficiency of the device results, since it allows about a hundred per cent increase in power output for a given weight of motor.

A further improvement in the present invention resides in the provision of an outlet port 21 directly behind the fan 7 and cooperating with an air inlet port 22 formed in the control box 15 so as to permit a flow of cooling air from the fan 7 to enter the control box 15 and thereby cool the instruments contained therein such as rectifiers and voltage regulating devices. The control box 15 has air outlet ports 23.

From the foregoing, it will be seen that there is provided in the subject invention, a novel and improved cooling system for a motor-generator, particularly in the provision of air exhaust ports 20 adjacent the brushes 9 and 10 and commutator 8 and behind the fan 6 to carry away most of the heat from those elements. It has been found that the heat is more intense adjacent the brushes 9 and 10 than elsewhere in the unit, since both the I. R. drop through the carbon brushes 9 and 10 and considerable mechanical friction between the brushes 9 and 10 and the commutator 8 are present.

Moreover, the arrangement of the ports 21, 22 and 23 permit the cooling system of the motor-generator to also maintain the temperature of the several elements within the control box such as rectifiers and voltage regulators below their critical temperature.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A dynamoelectric machine comprising a drive motor, a shaft driven by said motor, a generator connected to said shaft, a common housing for enclosing said motor and generator, one fan member mounted on said shaft at one end thereof, another fan member mounted on said shaft at the other end thereof, said housing having air inlet openings at opposite ends thereof and air outlet openings in said housing formed intermediate the opposite ends of the housing, a commutator for said motor and brushes co-operating with said commutator, said commutator driven by said shaft and positioned adjacent said one fan member, said housing having an additional outlet opening formed therein adjacent said commutator and brushes and behind said one fan member, said one fan member drawing cooling air through the air inlet opening in one end of the housing and creating a flow of the cooling air across said commutator and brushes and out said additional outlet opening and through said motor and out one of said first mentioned outlet openings, and the other of said fans drawing cooling air through the air inlet opening in the other end of the housing and creating a flow of cooling air through said generator and out another of said first mentioned outlet openings.

2. A dynamoelectric machine comprising a drive motor, a shaft driven by said motor, a generator connected to said shaft, a common housing for enclosing said motor and generator, one fan member mounted on said shaft at one end thereof, another fan member mounted on said shaft at the other end thereof, said housing having air inlet openings at opposite ends thereof and air outlet openings in said housing formed intermediate the opposite ends of the housing, a commutator for said motor and brushes cooperating with said commutator, said commutator driven by said shaft and positioned adjacent said one fan member, said housing having an additional outlet opening formed therein adjacent said commutator and brushes and behind said one fan member, said one fan member drawing cooling air through the air inlet opening in one end of the housing and creating a flow of the cooling air across said commutator and brushes and out said additional outlet opening and through said motor and out one of said first mentioned outlet openings, the other of said fans drawing cooling air through the air inlet opening in the other end of the housing and creating a flow of cooling air through said generator and out another of said first mentioned outlet openings, a box carrying control instruments for said motor and generator, said box mounted on said housing, an additional passage opening from said housing and adjacent said other fan member for conducting a flow of cooling air from said other fan into said control box, and said control box having formed therein an outlet opening for said cooling air.

3. A dynamoelectric machine comprising a housing, a shaft rotatably mounted in said housing, pole members affixed within said housing, an armature mounted on said shaft and positioned in spaced relation to said pole members, said armature cooperating with said pole members, said housing having an air inlet opening in one end thereof and an air outlet opening in said housing at an opposite end of said armature, a commutator for said armature, brushes cooperating with said commutator, said commutator, connected to said shaft and positioned in the housing, a fan member mounted on said shaft adjacent said commutator and positioned in said housing at the one end of said housing in such a manner that upon rotation of said shaft said fan member may draw cooling air through the air inlet opening in the one end of the housing to cause flow of air across said commutator and brushes and through the space between said armature and pole members for cooling the same and out said first mentioned air outlet opening, said housing having an additional outlet opening formed therein adjacent said commutator and brushes and arranged in said housing behind said fan member so that a portion of the cooling air after flowing across said commutator and brushes may pass directly out through said additional outlet opening for effecting a rapid cooling of the commutator and brushes.

HAROLD GUSTOW HAAS.

REFERENCES CITED

The following references are of record in the file of this patent:

UNITED STATES PATENTS

| Number | Name | Date |
|---|---|---|
| 1,778,036 | Noble | Oct. 14, 1930 |
| 1,779,657 | Breidert | Oct. 28, 1930 |
| 2,231,675 | Lynn | Feb. 11, 1941 |

FOREIGN PATENTS

| Number | Country | Date |
|---|---|---|
| 227,557 | Great Britain | Jan. 22, 1925 |
| 383,674 | Great Britain | Nov. 24, 1932 |

Certificate of Correction

Patent No. 2,479,233.  August 16, 1949.

HAROLD GUSTOW HAAS

It is hereby certified that error appears in the printed specification of the above numbered patent requiring correction as follows:

Column 4, line 28, claim 3, after the word "commutator", second occurrence, strike out the comma;

and that the said Letters Patent should be read with this correction therein that the same may conform to the record of the case in the Patent Office.

Signed and sealed this 25th day of October, A. D. 1949.

[SEAL]

THOMAS F. MURPHY,
*Assistant Commissioner of Patents.*